US012741849B2

(12) United States Patent
Auxier et al.

(10) Patent No.: US 12,741,849 B2
(45) Date of Patent: Sep. 22, 2026

(54) ELEVATOR POWER SUPPLY

(71) Applicant: OTIS ELEVATOR COMPANY, Farmington, CT (US)

(72) Inventors: James Tilsley Auxier, Bloomfield, CT (US); Randy Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1176 days.

(21) Appl. No.: 17/737,927

(22) Filed: May 5, 2022

(65) Prior Publication Data

US 2023/0356979 A1 Nov. 9, 2023

(51) Int. Cl.

| | |
|---|---|
| ***B66B 11/02*** | (2006.01) |
| ***B66B 1/34*** | (2006.01) |
| ***B66B 9/00*** | (2006.01) |
| ***B66B 17/12*** | (2006.01) |

(52) U.S. Cl.
CPC ............ *B66B 11/0226* (2013.01); *B66B 1/34* (2013.01); *B66B 9/003* (2013.01); *B66B 17/12* (2013.01)

(58) Field of Classification Search
CPC . B66B 11/0226; B66B 11/0246; H01M 10/42
See application file for complete search history.

(56) References Cited

U.S. PATENT DOCUMENTS

| | | | | |
|---|---|---|---|---|
| 6,408,986 B1 * | 6/2002 | Ayano | B66B 1/461 | 187/290 |
| 7,896,137 B2 * | 3/2011 | Ishikawa | B66B 1/34 | 187/290 |
| 10,246,301 B2 * | 4/2019 | Dominguez | B66B 19/00 | |
| 11,970,369 B2 * | 4/2024 | Roberts | B66B 7/064 | |
| 2019/0047816 A1 * | 2/2019 | Madera | B66B 1/34 | |
| 2019/0144242 A1 * | 5/2019 | Shijo | H01F 27/36 | 187/393 |

FOREIGN PATENT DOCUMENTS

CN 113415699 A * 9/2021 ............ H01M 10/42

OTHER PUBLICATIONS

Machine translation of CN 113415699.*

* cited by examiner

*Primary Examiner* — Diem M Tran
(74) *Attorney, Agent, or Firm* — Carlson, Gaskey & Olds, P.C.

(57) ABSTRACT

An illustrative example embodiment of an elevator system includes an elevator car that is configured for movement along a path. An elevator car power supply is supported for movement with the elevator car and includes a plurality of power sources. An exchange station near the path is configured to remove, from the elevator car supply, a selected number of the power sources that have a capacity below a selected level and replace each of the removed number of the power sources with a replacement power source having a capacity above the selected level.

21 Claims, 4 Drawing Sheets

ELEVATOR POWER SUPPLY

BACKGROUND

Elevator systems are useful for carrying passengers and items between different levels of a building. Elevator cars typically require electricity to power the lighting and ventilation for the elevator cab. The car operating panel is one example device typically situated within an elevator cab that has to communicate with other portions of the elevator system, such as a scheduler. Conventional elevator systems include a traveling cable that has one end connected with the elevator car to supply electrical power to the elevator car and to facilitate communications with the elevator car. Traveling cables are generally effective, however, they increase the material cost and weight associated with the elevator system.

SUMMARY

An illustrative example embodiment of an elevator system includes an elevator car that is configured for movement along a path. An elevator car power supply is supported for movement with the elevator car and includes a plurality of power sources. An exchange station near the path is configured to remove, from the elevator car supply, a selected number of the power sources that have a capacity below a selected level and replace each of the removed power sources with a replacement power source having a capacity above the selected level.

In addition to one or more of the features described above, or as an alternative, the elevator car power supply includes a rack, each of the power sources is at least partially received by a compartment of the rack, and each compartment includes an interface that is configured to establish an electrically conductive connection with the power source received by the compartment.

In addition to one or more of the features described above, or as an alternative, each compartment includes a retainer that is configured to secure the power source relative to the compartment to maintain the electrically conductive connection with the power source.

In addition to one or more of the features described above, or as an alternative, the exchange station includes at least one coupling device configured to remove the selected number of power sources that have the capacity below the selected level from the elevator car power supply, place each removed power source in a selected location on the exchange station where the capacity of the power source can be increased above the selected level, select the replacement power source from the exchange station for each removed power source, and place each replacement power source into a position on the elevator car power supply previously occupied by the corresponding removed power source.

In addition to one or more of the features described above, or as an alternative, the elevator system includes a capacity detector that detects the capacity of each of the power sources of the elevator car power supply and provides an indication regarding the detected capacity, and a controller that controls when the exchange station removes the selected number of power sources from the elevator car power supply.

In addition to one or more of the features described above, or as an alternative, the elevator system includes a vertical motion and dispatching controller that receives an indication from at least one of the capacity detector and the controller. The vertical motion and dispatching controller directs the elevator car to travel to the exchange station when the indication from the capacity detector corresponds to a need to remove and replace the selected number of the power sources.

In addition to one or more of the features described above, or as an alternative, the elevator car includes a top, a bottom, and sides between the top and the bottom; and the elevator car power supply is supported on at least one of the sides of the elevator car.

In addition to one or more of the features described above, or as an alternative, the elevator car is cantilevered on one of the sides, and the elevator car power supply is supported on the one of the sides.

In addition to one or more of the features described above, or as an alternative, the elevator car includes a cab and the elevator car power supply is situated beneath the cab.

In addition to one or more of the features described above, or as an alternative, the elevator system includes a counterweight, and a load bearing assembly coupling the elevator car to the counterweight. The elevator car power supply is supported on the counterweight, and the elevator system includes at least one electrically conductive connection between the elevator.

In addition to one or more of the features described above, or as an alternative, the elevator system includes a second elevator car and a second elevator car power supply supported for movement with the second elevator car. The second elevator car power supply includes a plurality of power sources. The exchange station is configured to remove, from the second elevator car power supply, a selected number of the power sources that have a capacity below the selected level; and replace each of the removed number of the power sources with a replacement power source having a capacity above the selected level.

In addition to one or more of the features described above, or as an alternative, the elevator system includes a plurality of vertical paths and at least one horizontal transition path extending between the vertical paths. The elevator car power supply is supported on the elevator car, the second elevator car power supply is supported on the second elevator car, the elevator car and the second elevator car are each configured to move along the horizontal transition path, and the exchange station is in a location to remove and replace the selected number of power sources while the elevator car or the second elevator car is at a corresponding location along the horizontal transition path.

An illustrative example embodiment of a method includes: controlling movement of an elevator car along a path, wherein an elevator car power supply moves with the elevator car, the power supply including a plurality of power sources; determining that at least one of the plurality of power sources has a capacity below a selected level; causing the elevator car to move such that the elevator car power supply is adjacent an exchange station; removing, from the elevator car power supply, a selected number of the power sources that have the capacity below the selected level; and replacing each of the removed number of the power sources with a replacement power source having a capacity above the selected level.

In addition to one or more of the features described above, or as an alternative, the elevator car includes a top, a bottom, and sides between the top and the bottom; and the elevator car power supply is supported on at least one of the sides of the elevator car.

In addition to one or more of the features described above, or as an alternative, the elevator car is cantilevered on one of the sides, and the elevator car power supply is supported on the one of the sides.

In addition to one or more of the features described above, or as an alternative, the elevator car includes a cab and the elevator car power supply is situated beneath the cab.

In addition to one or more of the features described above, or as an alternative, the method includes supporting the elevator car power supply on a counterweight coupling with the elevator, wherein at least one electrically conductive member connects the elevator car power supply and the elevator car.

The various features and advantages of at least one disclosed example embodiment will become apparent to those skilled in the art from the following detailed description. The drawings that accompany the detailed description can be briefly described as follows.

DETAILED DESCRIPTION

Figure 1:
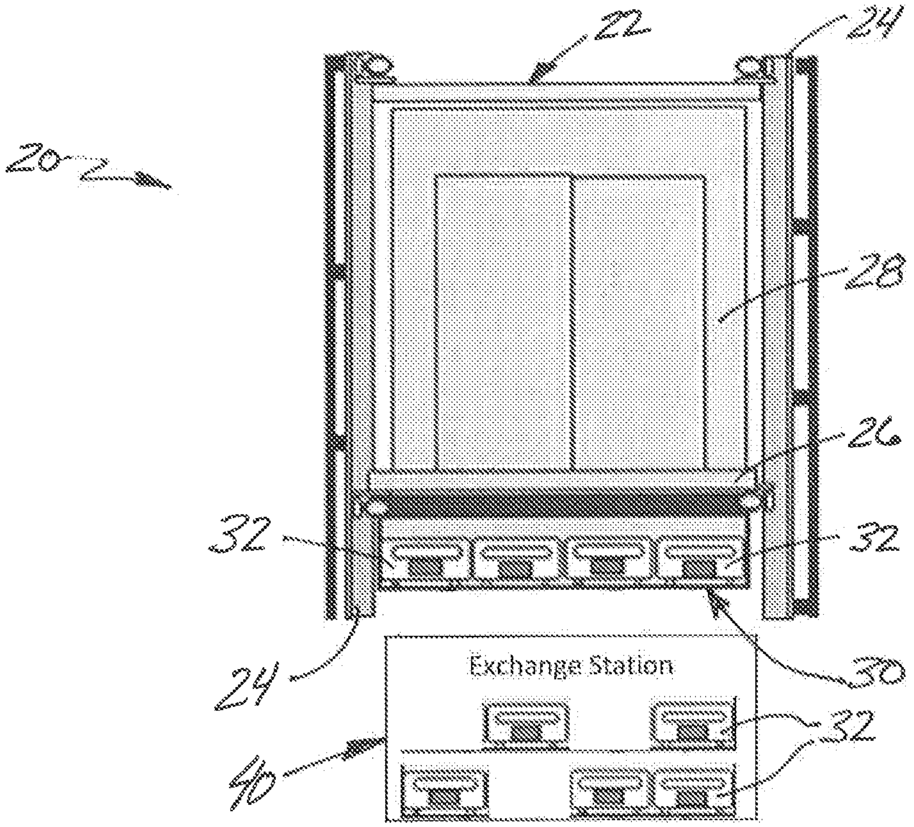
FIG. 1 schematically illustrates selected portions of an elevator system.

FIG. 1 schematically illustrates selected portions of an elevator system 20. An elevator car 22 is situated to move along a vertical path, which may be in a hoistway, such as by following guiderails 24 The elevator car 22 includes a frame 26 and a cab 28 supported on the frame 26.

An elevator car power supply 30 is supported on the elevator car 22. The elevator car power supply 30 includes a plurality of power sources 32. In some embodiments, each power source 32 comprises a rechargeable battery.

An exchange station 40 is situated near the path followed by the elevator car 22. The exchange station 40 is configured to remove a selected number of the power sources 32 from the elevator car power supply 30 when the elevator car 22 is situated in a position near the exchange station 40. The exchange station 40 removes power sources 32 that have a remaining capacity below a selected level or threshold. The exchange station 40 is also configured to replace each of the removed power sources 32 with a replacement power source 32 that has a capacity above the selected level. The exchange station 40 in the illustrated example embodiments includes the ability to recharge power sources 32 that have a diminished capacity so that the recharged power sources 32 can then be used to replace power sources 32 that are subsequently removed from the elevator car power supply 30.

Figure 2:
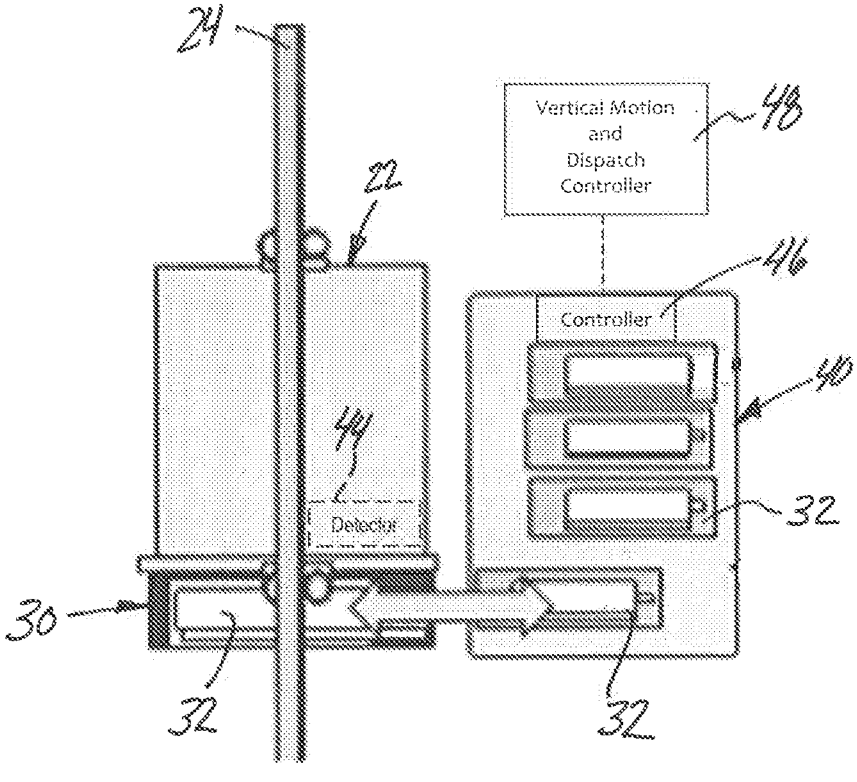
FIG. 2 schematically illustrates selected features of the embodiment shown in FIG. 1 from a side view.

As shown in FIG. 2, a capacity detector 44 is situated to detect the capacity of each of the power sources 32 of the elevator car power supply 30. The capacity detector 44 in some examples detects the voltage or charge level of each of the power sources 32. In some embodiments, the detector 44 comprises a voltmeter. The capacity detector 44 provides an indication regarding the detected capacity of each of the power sources 32 to a controller 46.

The controller 46 in the illustrated example embodiment includes a computing device, such as a processor and memory associated with the processor. The controller 46 is configured, for example by programming, to perform removal and replacement operations to meet the needs of the particular elevator system in which it is being used. The exchange station 40 removes any number of the power sources 32 from the elevator car power supply 30 when such power sources 32 have a capacity below a preselected threshold level. Power sources 32 from the exchange station 40 that have a higher level of power above the selected threshold level replace those that were removed from the elevator car power supply 30.

The elevator system 20 includes a vertical motion and dispatching controller 48 that directs movement of the elevator car 22. The detector 44, controller 46, or both communicate with the controller 48 so the controller 48 can schedule an appropriate time for the elevator car 22 to reach and remain at the exchange station 40. The controller 48 is configured, for example, to direct the elevator car 22 to travel to the exchange station 40 as a scheduled stop. The controller 48 also receives information from the detector 44, controller 46, or both indicating the status of a power source exchange so the controller 48 will not issue a command for the elevator car 22 to travel to another position until the exchange procedure is complete.

FIG. 2 schematically shows the detector 44 supported on the elevator car 22 and the controller 46 as part of the exchange station 40. In such an arrangement, wireless communications using a known communication protocol, such as Bluetooth, allows the controller 46 to obtain the indications from the detector 44 regarding the respective capacities or charge levels of the power sources 32. The respective positions of the detector 44 and the controller 46 in FIG. 2 are shown for discussion purposes only. In other embodiments, for example, a detector 44 is situated within the exchange station 40 and on board the elevator car 22. Additionally, the elevator car 22 may support some control electronics that are at least partially responsible for facilitating removing and replacing power sources 32 from the elevator car power supply 30.

Figure 3:
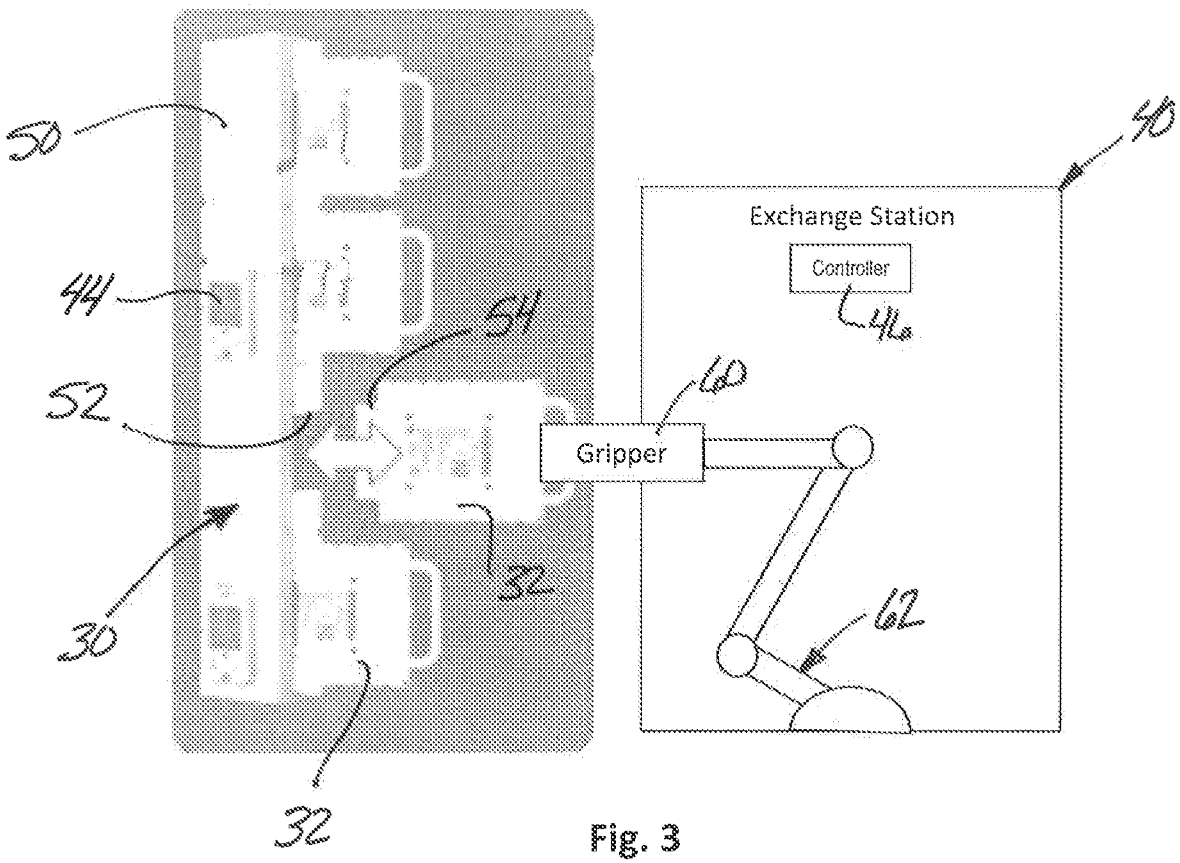
FIG. 3 schematically illustrates selected features of an elevator car power supply and an exchange station.

As can be appreciated from FIG. 3, the example elevator car power supply 30 includes a rack 50 that supports the power sources 32. In this example, the rack 50 includes a plurality of compartments 52, such as slots, that at least partially receive a corresponding one of the power sources 32. Each compartment 52 in this example includes an electrical connector interface that establishes an electrically conductive connection with the power source 32 that is received by that compartment 52. The example power source 32 shown in FIG. 3 includes a connector portion 54 for establishing that connection.

The rack 50 includes a retainer that secures the power sources 32 relative to their respective compartments 52 to maintain the electrically conductive connection with each power source 32. The retainer also establishes a physically secured connection so that the power sources 32 remain in a desired arrangement throughout movement of the elevator car 22.

At least one coupling device at the exchange station 40 includes a gripper 60 and an actuator 62 that moves the gripper 60 in an automated fashion based upon commands from the controller 46. The gripper 60 is configured to grasp a selected power source from the elevator car power supply 30, remove that power source 32 and place it into a location at the exchange station 40 where the power source 32 can be recharged. The gripper 60 also grasps a more highly charged power source 32 from the exchange station 40 to replace the power source 32 that has been removed from the rack 50. The coupling device and power source configurations may vary to meet the needs of a particular installation.

Figure 4:
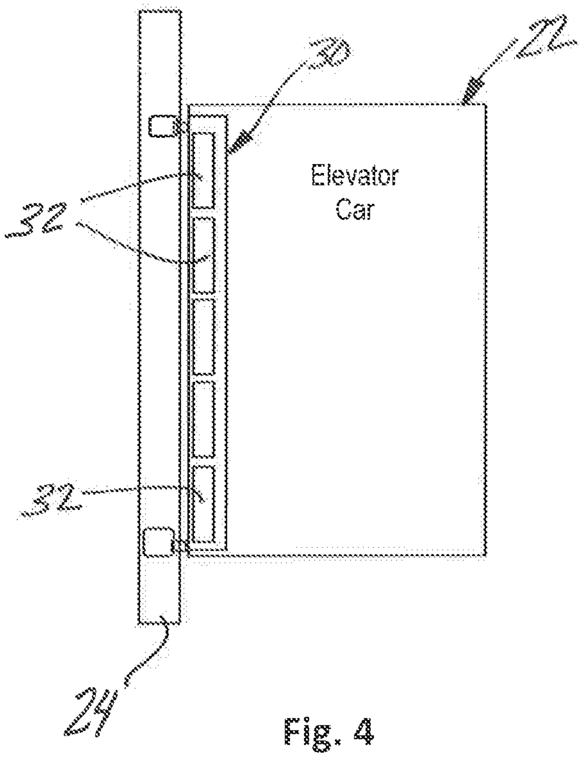
FIG. 4 schematically illustrates another example configuration of an elevator car.

The example embodiment shown in FIGS. 1 and 2 includes the elevator car power supply 30 supported beneath the cab 28 of the elevator car 22. Another example arrangement is shown in FIG. 4. In this embodiment, the elevator car 22 includes an elevator car power supply 30 that is situated along one of the sides of the elevator car 22. Each of the example elevator cars includes a top, a bottom, and a plurality of sides extending between the top and bottom. In the example of FIG. 4, the elevator car 22 is a cantilevered elevator car. The elevator car power supply 30 is situated along the side of the elevator car 22 that is closest to the structure, such as the guiderail 24, that supports the elevator car 22.

Other example embodiments include the power sources 32 of the elevator car supply 30 distributed among a plurality of sides of the elevator car. Those skilled in the art who have the benefit of this description will realize an appropriate arrangement and location for the power sources 32 to achieve a desired car configuration and balance to meet their particular needs.

Figure 5:
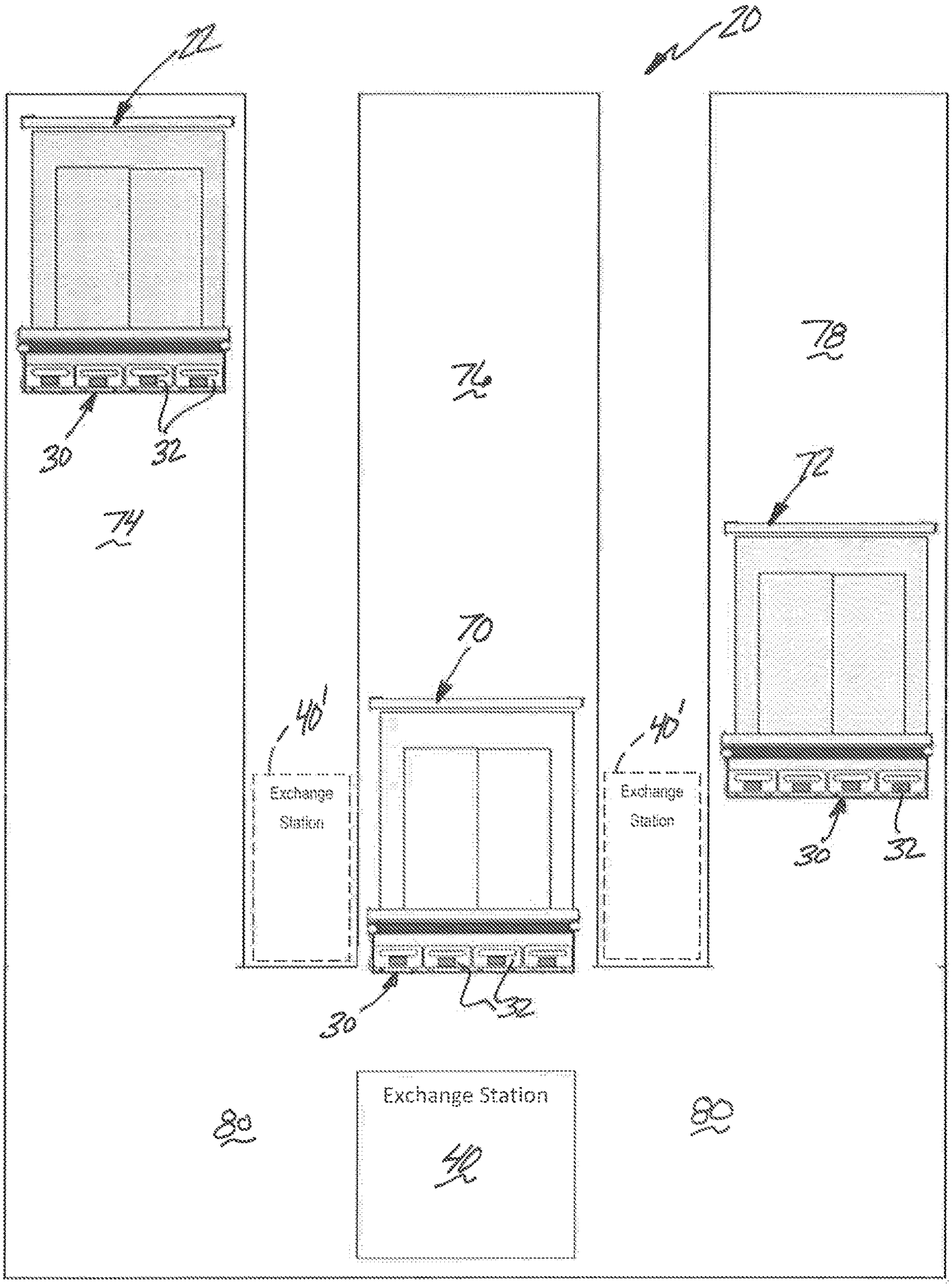
FIG. 5 schematically illustrates an example arrangement of an elevator system including multiple vertical pathways and at least one horizontal oriented transition pathway.

FIG. 5 schematically illustrates an example elevator system 20 that includes a plurality of elevator cars including the elevator car 22, a second elevator car 70, and a third elevator car 72. The example elevator system 20 includes a plurality of vertical pathways 74, 76 and 78. Each of the elevator cars 22, 70 and 72 is capable of moving along each of the vertical pathways 74-78. A horizontally oriented transition path 80 facilitates movement of the elevator cars 22, 70, 72 among the vertical paths or hoistways 74-78.

In an embodiment like that shown in FIG. 5, the exchange station 40 may be situated in or near the transition path 80 so that power sources 32 may be removed and replaced from the elevator car power supply 30 while that elevator car is in a corresponding position along the transition path 80. In such an embodiment, a single exchange station includes enough power sources 32 and charging capability to maintain adequate power supply for all of the elevator cars 22, 70, 72. Utilizing the transition path 80 for performing any power source exchange avoids interrupting use of an elevator car within one of the vertical paths 74-78.

FIG. 5 also schematically shows exchange stations 40' between two of the vertical paths or hoistways 74, 76, 78. Assuming the elevator system was configured without the transition path 80 and each of the illustrated elevator cars 22, 70, 72 is dedicated to the corresponding hoistway or vertical path 74, 76, 78, the exchange stations 40' are situated to be able to service both elevator cars on either side of the exchange station.

Figure 6:
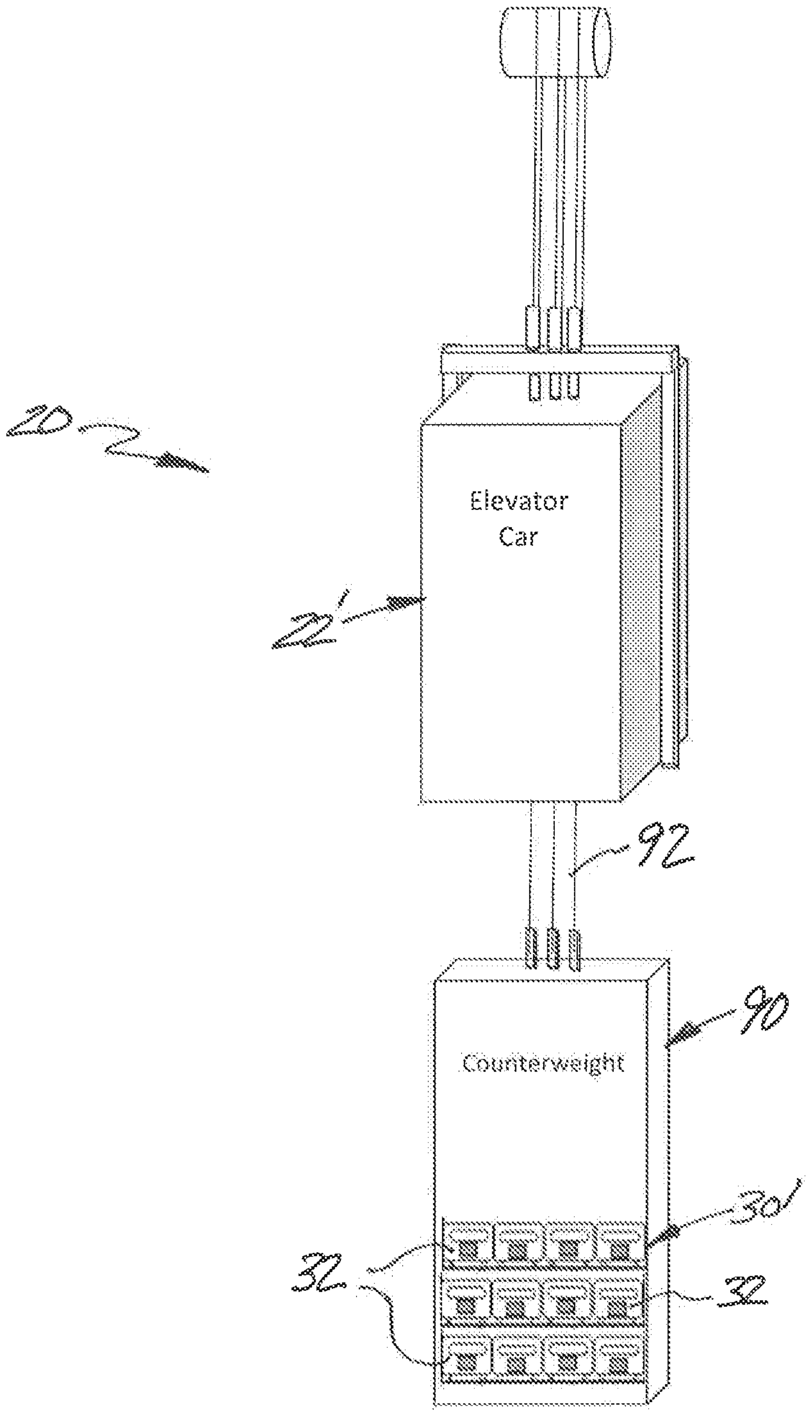
FIG. 6 schematically illustrates another elevator system configuration.

FIG. 6 illustrates another example configuration of an elevator system. In this embodiment, the elevator car 22' is coupled with a counterweight 90 by a load bearing assembly or roping 92. The elevator car power supply 30' in this example embodiment is situated on the counterweight 90. At least one electrically conductive member extends between the elevator car power supply 30' and the elevator car 22' to provide power to the elevator car 22'. In some embodiments, the load bearing assembly 92 includes the electrically conductive member. One feature of the example embodiment shown in FIG. 6 is that the mass of the elevator car power supply 30' contributes to the mass required for the counterweight 90 rather than adding to the mass of the elevator car 22'.

Disclosed example embodiments provide the ability to apply power to an elevator car without requiring a traveling cable. Utilizing multiple power sources that can individually be removed and replaced depending on their current capacity or charge level enhances various aspects of supplying power to an elevator car using a power supply that travels with the elevator car through a hoistway.

Individually and selectively removing and replacing power sources 32 provides the ability to maintain the overall power available from the elevator car power supply 30 above a selected minimum level without substantially interrupting the ability of the elevator car 22 to service passengers. Swapping out one or more of the power sources 32 can occur relatively quickly and in an automated fashion while the elevator car 22 is parked at a landing, for example.

Individually and selectively controlling when power sources 32 are removed and replaced also allows for the elevator car 22 to remain in service for extended periods of time provided that the power sources 32 on board the elevator car 22 (or counterweight in an embodiment like that shown in FIG. 6) have appropriate capacity to power the elevator car as needed.

Additionally, the useful life of the power sources 32, which may be lithium ion batteries for example, can be extended by maintaining the charge level of the power sources 32 below an upper threshold and above a minimum threshold. In other words, a shallow charging cycle for each power source 32 is possible when using multiple power sources 32 for the elevator car power supply 30 without removing the elevator car 22 from service for extended periods of time.

Additionally, having a plurality of power sources 32 allows for a mechanic or technician to more easily service the elevator car power supply 30 compared to an arrangement that has a single battery or power source.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:

an elevator car that is configured for movement along a path;

an elevator car power supply supported for movement with the elevator car, the power supply including a plurality of power sources supported on a common rack; and an exchange station including an additional plurality of power sources, the exchange station positioned near the path and configured to:

remove, from the elevator car power supply, a selected number of the power sources from the plurality of power sources that have a capacity below a selected level; and replace each of the removed number of the power sources with a replacement power source selected from the additional plurality of power sources where the replacement power source has a capacity above the selected level.

2. The elevator system of claim 1, wherein:

each of the plurality of power sources is at least partially received by a compartment of the common rack; and each compartment includes an interface that is configured to establish an electrically conductive connection with the power source received by the compartment.

3. The elevator system of claim 2, wherein each compartment includes a retainer that is configured to secure the power source relative to the compartment to maintain the electrically conductive connection with the power source.

4. The elevator system of claim 1, wherein the exchange station includes at least one coupling device configured to remove the selected number of power sources from the plurality of power sources that have the capacity below the selected level from the elevator car power supply, place each removed power source in a selected location on the exchange station where the capacity of the power source can be increased above the selected level, select the replacement power source from the additional plurality of power sources of the exchange station for each removed power source, and place each replacement power source into a position on the elevator car power supply previously occupied by the corresponding removed power source.

5. The elevator system of claim 1, comprising:

a capacity detector that detects the capacity of each of the plurality of power sources of the elevator car power supply and provides an indication regarding the detected capacity, and a controller that controls when the exchange station removes the selected number of power sources from the elevator car power supply.

6. The elevator system of claim 5, comprising a vertical motion and dispatching controller that receives an indication from at least one of the capacity detector and the controller, wherein the vertical motion and dispatching controller directs the elevator car to travel to the exchange station when the indication from the capacity detector corresponds to a need to remove and replace the selected number of the power sources.

7. The elevator system of claim 1, wherein the elevator car includes a top, a bottom, and sides between the top and the bottom; and the elevator car power supply is supported on at least one of the sides of the elevator car.

8. The elevator system of claim 7, wherein the elevator car is cantilevered on one of the sides, and the elevator car power supply is supported on the one of the sides.

9. The elevator system of claim 1, wherein the elevator car includes a cab and the elevator car power supply is situated beneath the cab.

10. The elevator system of claim 1, wherein the exchange station is configured to recharge removed power sources from the elevator car power supply that have a diminished capacity so that recharged power sources can then be used to replace power sources from the plurality of power sources from the elevator car power supply that are subsequently removed from the elevator car power supply.

11. The elevator system of claim 1, wherein one exchange station is configured to exchange power sources from the additional plurality of power sources with a plurality of elevators that travel along different paths from each other.

12. An elevator system, comprising:

an elevator car that is configured for movement along a path;

an elevator car power supply supported for movement with the elevator car, the power supply including a plurality of power sources;

a counterweight; and a load bearing assembly coupling the elevator car to the counterweight, wherein the elevator car power supply is supported on the counterweight, and the elevator system includes at least one electrically conductive connection between the elevator car power supply and the elevator car; and an exchange station near the path and configured to:

remove, from the elevator car power supply, a selected number of the power sources that have a capacity below a selected level and replace each of the removed number of the power sources with a replacement power source having a capacity above the selected level.

13. An elevator system, comprising:

an elevator car that is configured for movement along a path;

an elevator car power supply supported for movement with the elevator car, the power supply including a plurality of power sources;

an exchange station near the path and configured to:

remove, from the elevator car power supply, a selected number of the power sources that have a capacity below a selected level; and replace each of the removed number of the power sources with a replacement power source having a capacity above the selected level;

a second elevator car; and a second elevator car power supply supported for movement with the second elevator car, the second elevator car power supply including a plurality of power sources, wherein the exchange station is configured to:

remove, from the second elevator car power supply, a selected number of the power sources that have a capacity below the selected level; and replace each of the removed number of the power sources with a replacement power source having a capacity above the selected level.

14. The elevator system of claim 13, comprising a plurality of vertical paths and at least one horizontal transition path extending between the vertical paths, wherein the elevator car power supply is supported on the elevator car, the second elevator car power supply is supported on the second elevator car, the elevator car and the second elevator car are each configured to move along the horizontal transition path, and the exchange station is in a location to remove and replace the selected number of power sources while the elevator car or the second elevator car is at a corresponding location along the horizontal transition path.

15. A method, comprising:

controlling movement of an elevator car along a path, wherein an elevator car power supply moves with the elevator car, the elevator car power supply including a plurality of power sources supported on a common rack;

determining that at least one of the plurality of power sources has a capacity below a selected level;

causing the elevator car to move such that the elevator car power supply is adjacent an exchange station;

removing, from the elevator car power supply, a selected number of the power sources that have the capacity below the selected level; and replacing each of the removed number of the power sources with a replacement power source having a capacity above the selected level, the replacement power source being selected from an additional plurality of power sources from one exchange station positioned near the path.

16. The method of claim 15, wherein the elevator car includes a top, a bottom, and sides between the top and the bottom; and the elevator car power supply is supported on at least one of the sides of the elevator car.

17. The method of claim 16, wherein the elevator car is cantilevered on one of the sides, and the elevator car power supply is supported on the one of the sides.

18. The method of claim 15, wherein the elevator car includes a cab and the elevator car power supply is situated beneath the cab.

19. The method of claim 15, including configuring the exchange station to recharge removed power sources from the elevator car power supply that have a diminished capacity so that recharged power sources can then be used to replace power sources from the plurality of power sources from the elevator car power supply that are subsequently removed from the elevator car power supply.

20. The method of claim 15, including configuring the one exchange station to exchange power sources from the additional plurality of power sources with a plurality of elevators that travel along different paths from each other.

21. A method, comprising:

controlling movement of an elevator car along a path, wherein an elevator car power supply moves with the elevator car, the power supply including a plurality of power sources;

supporting the elevator car power supply on a counterweight coupling with the elevator, wherein at least one electrically conductive member connects the elevator car power supply and the elevator car;

determining that at least one of the plurality of power sources has a capacity below a selected level;

causing the elevator car to move such that the elevator car power supply is adjacent an exchange station;

removing, from the elevator car power supply, a selected number of the power sources that have the capacity below the selected level; and replacing each of the removed number of the power sources with a replacement power source having a capacity above the selected level.

* * * * *